United States Patent [19]

Daitoku et al.

[11] Patent Number: 5,221,940
[45] Date of Patent: Jun. 22, 1993

[54] FILM FEEDER FOR A CAMERA

[75] Inventors: Koichi Daitoku, Sagamihara; Akira Ezawa, Tokyo; Hideya Inoue, Yokohama, all of Japan

[73] Assignee: Nikon Corporation, Tokyo, Japan

[21] Appl. No.: 943,112

[22] Filed: Sep. 10, 1992

Related U.S. Application Data

[63] Continuation of Ser. No. 724,772, Jul. 2, 1991, abandoned.

[30] Foreign Application Priority Data

Jul. 10, 1990 [JP] Japan .................................. 2-181975

[51] Int. Cl.⁵ .............................................. G03B 1/18
[52] U.S. Cl. ................................ 354/173.1; 354/212
[58] Field of Search ............... 354/171, 173.1, 173.11, 354/212

[56] References Cited

U.S. PATENT DOCUMENTS

| | | | |
|---|---|---|---|
| 4,832,275 | 5/1989 | Robertson | 242/71.1 |
| 4,939,531 | 7/1990 | Sawamura et al. | 354/173.1 |
| 4,967,213 | 10/1990 | Han | 354/173.1 |

Primary Examiner—David M. Gray
Attorney, Agent, or Firm—Shapiro and Shapiro

[57] ABSTRACT

A film feeder for a camera comprises a feeding out mechanism for feeding out film of a film cartridge wound around a spool shaft, by rotating the spool shaft of the loaded film cartridge; a winding up mechanism for driving a wind up spool to wind up around the wind up spool the film fed out of the film cartridge; a roller provided between the loaded film cartridge and the wind up spool, which is driven by the driving power of a motor to feed the film fed out by the feeding out mechanism and guide the film to the wind up spool; and a driving power transmission mechanism for transmitting the driving power of the motor to the roller until the film is wound around the wind up spool and thereafter cutting off the transmission of the driving power to the roller.

7 Claims, 2 Drawing Sheets

FILM FEEDER FOR A CAMERA

This is a continuation of application Ser. No. 724,772 filed Jul. 2, 1991, now abandoned.

BACKGROUND OF THE INVENTION

1. Field of the Invention

The present invention relates to a film feeder for a camera capable of feeding out of a cartridge a film wound around the shaft of a spool in the cartridge by rotating the spool shaft of the film loaded cartridge.

2. Related Background Art

For example, a film cartridge given below is disclosed in U.S. Pat. No. 4,832,275. This cartridge comprises a cylindrical portion accommodating the shaft of a spool with a film wound around it, and a feeding out portion provided extendedly in the tangential direction of the cylindrical portion with which this feeding out portion is integrally constructed. In the feeding out portion, the leading end of the film is accommodated in a linearly state. The, the film is not exposed from this cartridge unless the cartridge is loaded into the camera.

As the camera for which a cartridge of this kind is usable, the one such as given below has been proposed. When the cartridge is loaded into the main body of such type of camera, the shaft of the spool (with a film wound around it) is first caused to rotate and thrust the film out of the cartridge to the side of its wind up spool (this is called thrust motion). Subsequently to this, the leading end of the film is wound around the wind up spool in the main body of the camera for the usual winding motion; thus making the camera ready for photographing.

However, the above-mentioned thrust motion is actuated in such a manner that when the spool shaft in the cartridge is rotated, the film is given a thrust in the cartridge, and the film is pushed out by its own thrusting strength. Therefore, if a load is applied to the leading end of the film by the friction or the like of the film rail, for example, film jamming is caused in the cartridge, thus hindering the actuation of the thrust motion. Then, there is a good possibility that the subsequent winding operation fails. A problem such as this can be prevented to a certain extent if the film feed speed is slowed down when the thrust is exerted. Nevertheless, a complete prevention cannot be anticipated. In addition, there is a disadvantage that it takes a longer time before the camera is ready for photographing subsequent to loading the cartridge into the camera due to the slowing down of the thrust speed.

SUMMARY OF THE INVENTION

The object of the present invention is to provide a film feeder capable of performing the thrust motion and the subsequent winding operation reliably without slowing down the film feeding speed when the thrust is exerted.

Now, according to FIG. 1 in which an embodiment is illustrated, the present invention is applicable to a film feeder for a camera provided with a feeding mechanism 100 for feeding a film FI wound around the spool shaft 11a out of the cartridge 10 by rotating the spool shaft 11a (FIG. 2) of the loaded film cartridge 10, and a winding mechanism 200 for winding up the film FI fed from the cartridge 10 to a spool 21 by driving the wind up spool 21. The film feeder is further provided with a roller 31 arranged between the loaded film cartridge 10 and the wind up spool 21, which is driven by the driving power of a motor 41, to feed the film FI fed out by the feeding mechanism 100 and guide it to the wind up spool 21, and a power transmission mechanism 300 to transmit the driving power from the motor 41 to the roller 31 until the film FI is wound around the wind up spool 21 and to cut off the aforesaid driving power to the roller 31 thereafter, thus solving the above-mentioned problems.

The power transmission mechanism 300 transmits the driving power of the motor 41 to the roller 31 to feed the film FI fed out of the cartridge 10 by the feeding mechanism 100 and guide it to the wind up spool 21. Then, when the film FI is wound around the wind up spool 21, the power transmission mechanism 300 cuts off the power transmission to the roller 31, and subsequently, the film FI is wound up to the spool 21 by the winding mechanism 200. Since the roller 31 for feeding the film is arranged between the loaded film cartridge 10 and the wind up spool 21, no film jamming is caused in the cartridge even if the film feeding speed is not slowed down when the thrust is exerted, and the thrust motion and the subsequent wind up operation are reliably performed.

In this respect, in order to make the structure of the present invention readily understandable, the drawing of the present invention is used, but it is to be understood that the present invention is not limited only to such embodiment as shown therein.

BRIEF DESCRIPTION OF THE DRAWINGS

FIG. 1 is a view showing the entire structure of a film feeder according to the present invention;

FIG. 2 is a sectional view partially showing the film feeder observed from above the camera;

FIG. 3 and FIG. 4 are views illustrating the film feeding, and FIG. 3 shows a state where the film is not fed, and FIG. 4 shows a state where the film is being fed respectively.

DESCRIPTION OF THE PREFERRED EMBODIMENTS

An embodiment of the present invention will be described in conjunction with FIG. 1 through FIG. 4.

Figure 2:
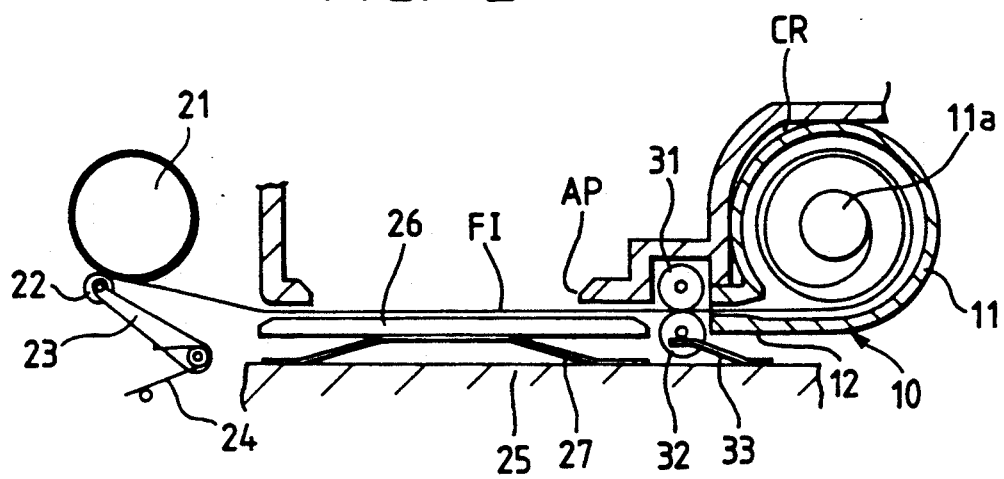
Figure 3:
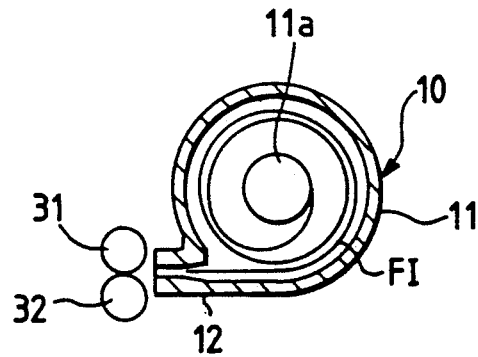

FIG. 2 is a sectional view showing the film feeder observed from above the camera. A reference numeral 10 designates a film cartridge loaded in the cartridge chamber CR at one end side of the main body of the camera, and this cartridge 10 comprises a cylindrical portion 11 accommodating a spool shaft 11a, and feeding out portion 12 integrally joined to this cylindrical portion 11 in the tangential direction thereof. In the cylindrical portion 11, a film FI is accommodated in a state where the film is wound around the spool shaft 11a, and the leading end of the film FI is accommodated in the feeding out portion 12 in the linear state as shown in FIG. 3. In other words, the film FI is completely accommodated in the cartridge 10 when the cartridge 10 is loaded into the main body of the camera.

A reference numeral 21 designates a wind up spool provided at the other end side of the main body of the camera to wind up the film FI fed out from the aforesaid cartridge 10; 22, a pressure roller for film, which is rotatably supported at the leading end of a supporting lever 23 to be compressed by a spring 24 onto the periphery of the wind up spool 21; 25, a rear cover; and 26, a pressure plate to compress the film FI toward the aperture AP by the tension of a spring 27.

Also, between the loaded cartridge 10 and the pressure plate 26, i.e., between the cartridge 10 and the wind up spool 21, a film feeding roller 31 and a pressure roller 32 are provided, and the pressure roller 32 is tensioned against the periphery of the roller 31 by a flat spring 33. The film FI fed out from the cartridge 10 is pinched between the rollers 31 and 32 and fed to the wind up spool 21 side by the rotation of the roller 31.

Figure 1:
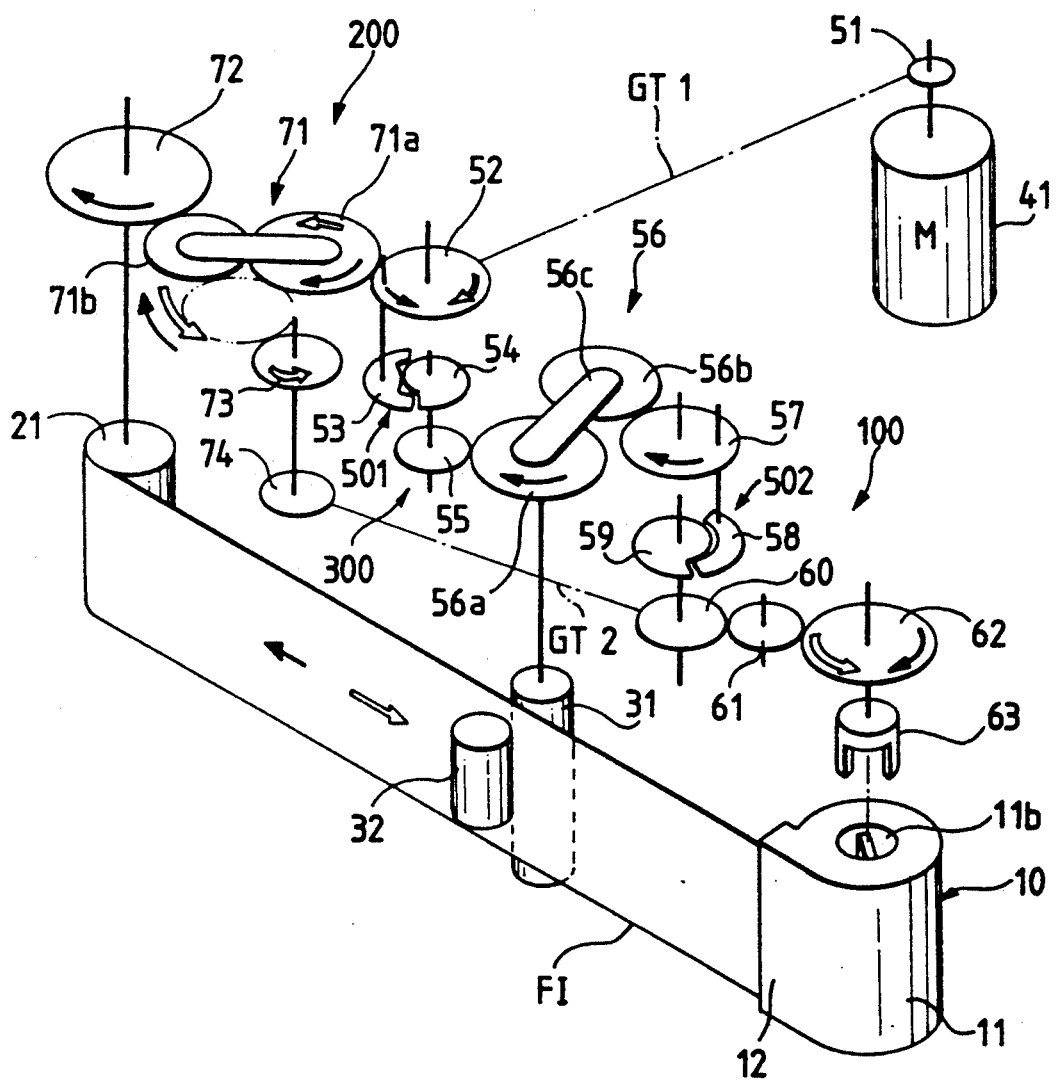
FIG. 1 through FIG. 4 illustrate an embodiment of the present invention.

FIG. 1 is a view schematically showing the driving system for the above-mentioned wind up spool 21, roller 31 and spool shaft 11a of the cartridge 10.

The rotation of a gear 51 mounted on the output shaft of the film feeding motor 41 is transferred to a gear 52 through a gear train GT1. The rotation of the gear 52 is transferred to a gear 62 through a one-way clutch 501, gear 55, planetary gear mechanism 56, one way clutch 502 and gears 57, 60, and 61. To the gear 62 a cartridge driving nail 63 is mounted to be engaged with the fitting portion 11b provided at the upper end of the spool shaft 11a of the cartridge 10, and by the rotation of the gear 62 in the clockwise direction, the spool shaft 11a is rotated in the same direction to cause the film FI in the cartridge 10 to be fed out of the feeding outlet (not shown) provided at the leading end of the feeding out portion 12. In other words, the thrust driving is performed.

A planetary gear mechanism 56 comprises a sun gear 56a and a planetary gear 56b which engages with this sun gear 56a and is connected to the sun gear 56a by a lever 56c. This planetary gear 56b is configured to oscillate in the rotational direction of the sun gear 56a. Accordingly, when the sun gear 56a rotates in the clockwise direction, the planetary gear 56b engages with the gear 57, and when the sun gear 56a rotates in the anticlockwise direction, the planetary gear 56b is disengaged from the gear 57 and rotates idly.

Also, the sun gear 56a is connected to the above-mentioned film feeding roller 31, and by the rotation thereof, the roller 31 is caused to rotate. The gear ratio of each of the gears is defined so as to make the film feeding speed by this roller 31 faster than the film feeding speed by the rotation of the above-mentioned cartridge driving nail 63 at the time of the thrust driving.

Further, the one-way clutch 502 comprises a nail 58 and a staged cam 59, and its configuration is made to allow the nail 58 to engage with the staged cam 59 usually when the nail rotates in the anticlockwise direction and release the engagement when it rotates in the clockwise direction. Therefore, while the nail 58 is being rotated in the anticlockwise direction, if the staged cam 59 is rotated faster than the nail 58 in the same direction, the nail is in a state of rotating in the reverse direction relatively so that the engagement between them is released. This relationship is equally applicable to the nail 53 and staged cam 54, which constitute the one-way 501.

Meanwhile, the rotation of the above-mentioned gear 52 is also transferred to a gear 72 through a planetary gear mechanism 71, and by the rotation of the gear 72, the wind up spool 21 is rotated. The planetary gear mechanism 71 is configured in the same way as the above-mentioned planetary gear mechanism 56, and when the sun gear 71a rotates in the clockwise direction, the planetary gear 71b engages with the gear 72, and when the sun gear 71a rotates in the anticlockwise direction, it engages with the gear 73. Then, with the configuration thus made, the rotation of the gear 73 in the anticlockwise direction is transferred to the above-mentioned gear 60 through a gear 74 and a gear train GT2.

The gear ratio of each of the gears is defined so as to make the film feeding speed at the time of winding up by the wind up spool 21 faster than the film feeding speed by the above-mentioned roller 31.

In the structure of the above-mentioned embodiment, the feeding mechanism 100 comprises the motor 41, gear train GT1, one-way clutches 501 and 502, planetary gear mechanism 56, gears 51, 52, 55, 57, 60, 61, and 62; the wind up mechanism 200 comprises the motor 41, gear train GT1, gears 51 and 52, planetary gear mechanism 71 and gear 72; and the power transmission mechanism 300 comprises the gear train GT1, gears 51, 52, 55, sun gear 56a, respectively.

Now the operation of the embodiment will be described.

When the above-mentioned cartridge 10 is loaded into the cartridge chamber CR (FIG. 2), the fitting portion 11b at the upper end of the spool shaft 11a of the cartridge 10 engages with the cartridge driving nail 63, and when the rear cover 25 is closed subsequent thereto, the motor 41 is actuated to rotate in the normal direction as an interlocking operation with this closing of the rear cover, for example. The rotation thereof is transferred to the gear 52 through the gear 51 and gear train GT1 to cause the gear 52 to rotate in the anticlockwise direction. The rotation of the gear 52 is transferred to the sun gear 56a of the planetary gear mechanism 56 through the one-way clutch 501 and gear 55 to cause the sun gear 56a to rotate in the clockwise direction; thus allowing the planetary gear 56b to engage with the gear 57 to rotate it in the clockwise direction.

The rotation of the gear 57 is transferred to the gear 62 through the one-way clutch 502 and gears 60 and 61 to cause the gear 62 to rotate in the clockwise direction thereby to rotate the spool shaft 11a of the cartridge 10 in the same direction by the engagement of the fitting portion 11b and the cartridge driving nail 63. Hence the film FI is fed out from the feeding outlet provided at the leading end of the feeding out portion 12. In other words, the trust motion is actuated.

Figure 4:
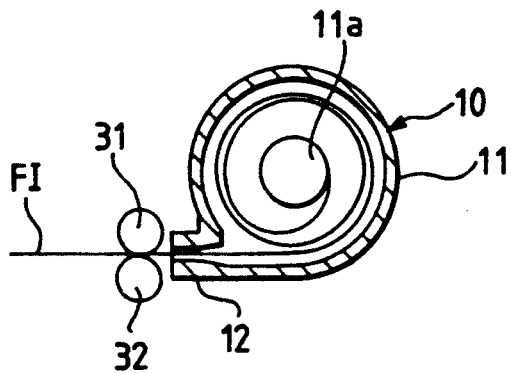

By this thrust motion, the leading end of the film FI is inserted between the roller 31 and the pressure roller 32. At this juncture, the roller 31 is being rotated in the clockwise direction by the clockwise rotation of the above-mentioned sun gear 56a. Therefore, as shown in FIG. 4, the film FI is fed towards the wind up spool 21 in a state that it is pinched by the rollers 31 and 32.

As set forth above, the film feeding speed by the rotation of the roller 31 is faster than the film feeding speed by the rotation of the cartridge nail 63. Consequently, the spool shaft 11a is driven by the feeding of the film FI, not by the driving power of the motor 41, to rotate faster than the speed described above at the moment the leading end of the film FI has reached the roller 31. Then, this rotation is transferred to the staged cam 59 through the gears 62, 61, and 60 to allow the staged cam 59 to rotate faster than the nail 58. In other words, the staged cam 59 is brought into a state in which it rotates relatively in the reverse direction with respect to the nail 58. Thus, the engagement of the one-way clutch 502 is released, and the driving power from the motor 41 is no longer transmitted to the cartridge 10. Hence, the film FI is fed only by the rotation of the roller 31 and at the same time, the cartridge shaft 11a is rotated only by this feeding of the film FI.

Meanwhile, the sun gear 71a of the planetary gear mechanism 71 is rotated in the clockwise direction. Therefore, the planetary gear 71b is oscillated in the clockwise direction while being engaged with the sun gear 71a and is engaged with the gear 72 as shown in FIG. 1. As a result, the rotation of the sun gear 71a is transferred to the gear 72 through the planetary gear 71b to cause the gear 72 to rotate in the clockwise direction; hence enabling the wind up spool 21 to rotate in the same direction.

Then, when the leading end of the film FI reaches the wind up spool 21 by the film feeding performed by the above-mentioned roller 31 and is inserted between the spool 21 and the pressure roller 22, the film FI is wound around the wind up spool 21 by means of an easy loading which is not shown in FIG. 1; thus the film FI is driven to be wound up by the rotation of the wind up spool 21. As described above, the film feeding speed at the time of the winding up by the wind up spool 21 is faster than the film feeding speed by the above-mentioned roller 31. Accordingly, the above-mentioned roller 31 rotates by the feeding of the film FI faster than the rotational speed originating from the motor 41. In this way, the rotational speed of the staged cam 54 becomes faster than that of the nail 53, and the nail 53 rotates relatively in the reverse direction with respect to the staged cam 54 to enable the engagement of the one-way clutch 501 to be released. As a result, the driving power of the motor 41 is no longer transmitted to the roller 31, and the film FI is fed only by the winding up motion of the wind up spool 21. At the same time, the roller 31 is rotated only by this feeding of the film FI.

The film feeding amount is sequentially detected by a detecting means (not shown), and when the feeding amount has reached a predetermined amount, the motor 41 is stopped to make the camera ready for photographing.

As described above, the film FI fed out from the cartridge 10 is guided to the wind up spool 21 by the roller 31 provided in the vicinity of the feeding outlet of film cartridge. Accordingly, there is no possibility that the film jamming occurs as in the case of the conventional art, and the film is wound around the wind up spool 21 reliably. Then, subsequent to the film having wound around the wind up spool, the power transmission to the roller 31 is cut off, and the film FI is fed only by the rotation of the wind up spool 21. Consequently, there is no possibility that any undesired force is exerted against the film FI to disturb the wind up motion.

Thereafter, each time a picture is taken, the film FI is wound up by the wind up spool 21 by one frame, and when the photographing for all the frames is completed, the motor 41 is actuated to rotate in the reverse direction to start the film rewinding operation. By the reverse rotation of the motor 41, the gear 52 rotates in the clockwise direction to allow the nail 53 to rotate in the same direction. Accordingly, the engagement of the nail 53 and staged cam 54 is released so that its rotation is not transferred beyond this staged cam 54.

Meanwhile, the sun gear 71a of the planetary gear mechanism 71 rotates in the anticlockwise direction by the rotation of the gear 52 in the clockwise direction and the planetary gear 71b is oscillated in the same direction to cause the gear 72 to engage with the gear 73. Therefore, the gear 73 rotates in the anticlockwise direction and the rotation thereof is transferred to the gear 60 through the gear 74 and the gear train GT2. The rotation of the gear 60 causes the gear 62 to rotate in the anticlockwise direction through the gear 61. Thus, the fitting portion 11b of the cartridge 11 is rotated in the anticlockwise by the driving nail 63 to rewind the film FI into the cartridge 10. When the film FI has been co rewound, the motor 41 is stopped.

Although the thrust motion, the film feeding operation by the roller 31, and the winding up motion are carried out in a configuration which uses the driving power of only one motor 41, it may be possible to perform each of them by individual motors. Accordingly, the structures of the above-mentioned feeding out mechanism, winding up mechanism, power transmission mechanism are not limited to those disclosed by the embodiment hereof. Also, while it is most effective to provide the roller 31 between the cartridge 10 and the pressure plate 26, there is still a certain effect obtainable if the roller is located elsewhere between the cartridge 10 and wind up spool 21. Further, the present invention is applicable to the so-called pre-wind camera in which the film FI is once wound up to the terminating end of the wind up spool 21 subsequent to loading the cartridge 10 into the main body of the camera and then the film FI is rewound by one frame each time a picture is taken.

According to the present invention, a driven roller for feeding a film is provided between the loaded film cartridge and wind up spool to guide the film fed out by the thrust motion to the wind up spool, and at the same time, when the winding of the film around the wind up spool is completed, the power transmission to the above-mentioned roller is cut off. Consequently, no film jamming occurs in the cartridge even if the film feeding speed is not slowed down when the thrust is exerted, and it is possible to perform the thrust motion and the subsequent winding up operation reliably and smoothly.

What is claimed is:

1. A film feeder for a camera, including:
   a feeding out mechanism for feeding a film wound around a spool shaft out of a cartridge by rotating said spool shaft;
   a winding up mechanism for driving a wind up spool for winding up around said wind up spool the film fed out from said film cartridge;
   a roller provided between said film cartridge and said wind up spool, which is driven by the driving power of a motor to feed the film fed out by said feeding out mechanism and guide the film to said wind up spool; and
   a power transmission mechanism for transmitting the driving power of said motor to said feeding out mechanism until said film reaches said roller and thereafter cutting off the transmission of said driving power to said feeding out mechanism, and for transmitting the driving power of said motor to said roller until said film is wound around said wind up spool and thereafter cutting off the transmission of said driving power to said roller.

2. The film feeder according to claim 1, wherein the film feeding speed of said winding up mechanism is faster than the film feeding speed of said roller, and the film feeding speed of said roller is faster than the film feeding speed of said feeding out mechanism.

3. The film feeder according to claim 1, wherein said driving power transmission mechanism also cuts off the transmission of said driving power to said winding up mechanism upon reverse rotation of said motor and transmits said driving power to said feeding out mechanism for rewinding the film to the inside of said cartridge.

4. A film feeder according to claim 1, wherein the film feeding speed of said winding up mechanism is faster than the film feeding speed of said roller.

5. A film feeder according to claim 1, wherein the film feeding speed of said roller is faster than the film feeding speed of said feeding out mechanism.

6. A film feeder for a camera, including:
 a feeding out mechanism for feeding a film wound around a spool shaft out of a cartridge by rotating said spool shaft;
 a winding up mechanism for driving a wind up spool for winding up around said wind up spool the film fed out from said film cartridge;
 a roller provided between said film cartridge and said wind up spool, to feed the film fed out by said feeding out mechanism and guide the film to said wind up spool, and
 a power transmission mechanism for transmitting a driving power to said feeding out mechanism until said film reaches said roller and thereafter cutting off the transmission thereof, and for transmission a driving power to said roller until said film is wound around said wind up spool and thereafter cutting off the transmission thereof.

7. A film feeder according to claim 6, including a motor that supplies said power transmission mechanism with both the driving power transmitted to said feeding out mechanism and to said roller.

* * * * *